United States Patent Office 3,470,681
Patented Oct. 7, 1969

3,470,681
COMBINE CONTROL SYSTEM
Karl Ludwig Saemann, Zweibrucken am Schonhof, Germany, assignor to Deere & Company, Moline, Ill., a corporation of Delaware
Filed Mar. 28, 1968, Ser. No. 716,710
Claims priority, application Germany, Apr. 14, 1967, D 52,807
Int. Cl. A01d 41/06
U.S. Cl. 56—20                                                                 9 Claims

ABSTRACT OF THE DISCLOSURE

A self-propelled combine having an infinitely variable belt-type propulsion drive and a conventional chain and slat feeder house conveyor for moving the crop from the header to the separator. The feeder house conveyor is also driven by an infinitely variable belt drive, the ratio in which is automatically adjustable in response to a change in the condition of some other variable function on the combine, so that the thickness of the mat of crop material delivered by the feeder house conveyor to the separator is automatically controlled.

Background of the invention

This invention relates to a combine control system, and more particularly to a control system for automatically controlling the speed of the feeder house conveyor.

In a conventional combine, the crop is removed from the field by a forwardly disposed harvesting header or platform and delivered upwardly and rearwardly therefrom to the separating mechanism in the combine body through an upwardly and rearwardly inclined feeder housing, which encloses some type of conveyor, generally a chain and slat undershot type conveyor, which moves the crop along the upwardly and rearwardly inclined floor of the feeder house. For proper operation, the separator, including the threshing cylinder, is driven at a constant speed, and therefore, the power source is also operated at a constant speed.

For efficient separation of the crop, it is desirable that the mat of the crop delivered by the feeder house conveyor to the threshing cylinder remain relatively constant. Since the density of the crop can vary widely, even in the same field, controlling the feed rate to the threshing cylinder has presented a problem.

In most machines currently in the field, a variable-speed propulsion drive is provided, so that the operator can vary the ground speed of the machine while the engine speed remains constant. In such machines, the feed rate of the crop is entirely dependent on the skill of the operator, since the operator must adjust the propulsion drive to a slower speed when the crop is dense and increase the ground speed in lighter crops.

To overcome the inherent inaccuracies in such a system, and to free the operator from the chore of constantly adjusting the ground speed of the machine, so that he may better attend to other functions of the combine, systems have been proposed to automatically adjust the ground speed in response to changes in certain conditions of the combine, such as an increasing thickness of the layer of crop material delivered to the threshing cylinder, an increase in torque required to drive the threshing cylinder or other combine components due to an increased feed rate through the components, or even a change in the manifold vacuum in the engine, caused by additional loading of the engine as a result of an excessive feed rate. However, such previous systems respond only after an overload occurs or after the excessive quantity of material is already in the machine, so that, for a time, at least, the threshing cylinder is overloaded.

Also, in previous combines and control systems therefor, the feeder house conveyor has been driven by the combine power source through a fixed ratio drive, so that the feeder house conveyor moves at a constant speed, the thickness of the mat of crop material delivered to the threshing cylinder being directly proportional to the crop feed rate, which, in the case of conventional combines, varies widely, and in the case of combines provided with automatic control systems, can temporarily exceed the limits for efficient separation.

Summary of the invention

According to the present invention, a combine control system is provided which includes a variable-speed drive for the feeder house conveyor so that the speed of the feeder house conveyor can be varied for any given speed of the combine power source, to control the thickness of the mat of material delivered by the feeder house conveyor to the threshing cylinder.

Also according to the present invention, means are provided for automatically controlling the speed of the feeder house conveyor in response to variations in the conditions of certain variable functions on the combine. More specifically, the speed of the feeder house conveyor is adjusted in response to variations in the thickness of the mat of material entering the feeder house conveyor, so that the thickness of the mat delivered to the threshing cylinder can be maintained within predetermined limits.

Also according to the present invention, a control system is provided which initially adjusts the speed of the feeder house conveyor to control the thickness of the mat delivered to the threshing cylinder, and also adjusts the ground speed of the combine if the amount of material delivered to the feeder house conveyor exceeds a predetermined limit.

Still another feature of the invention resides in the provision of means for automatically adjusting the speed of the feeder house conveyor in response to changes in the ground speed of the combine.

Description of the preferred embodiments

Figure 1:
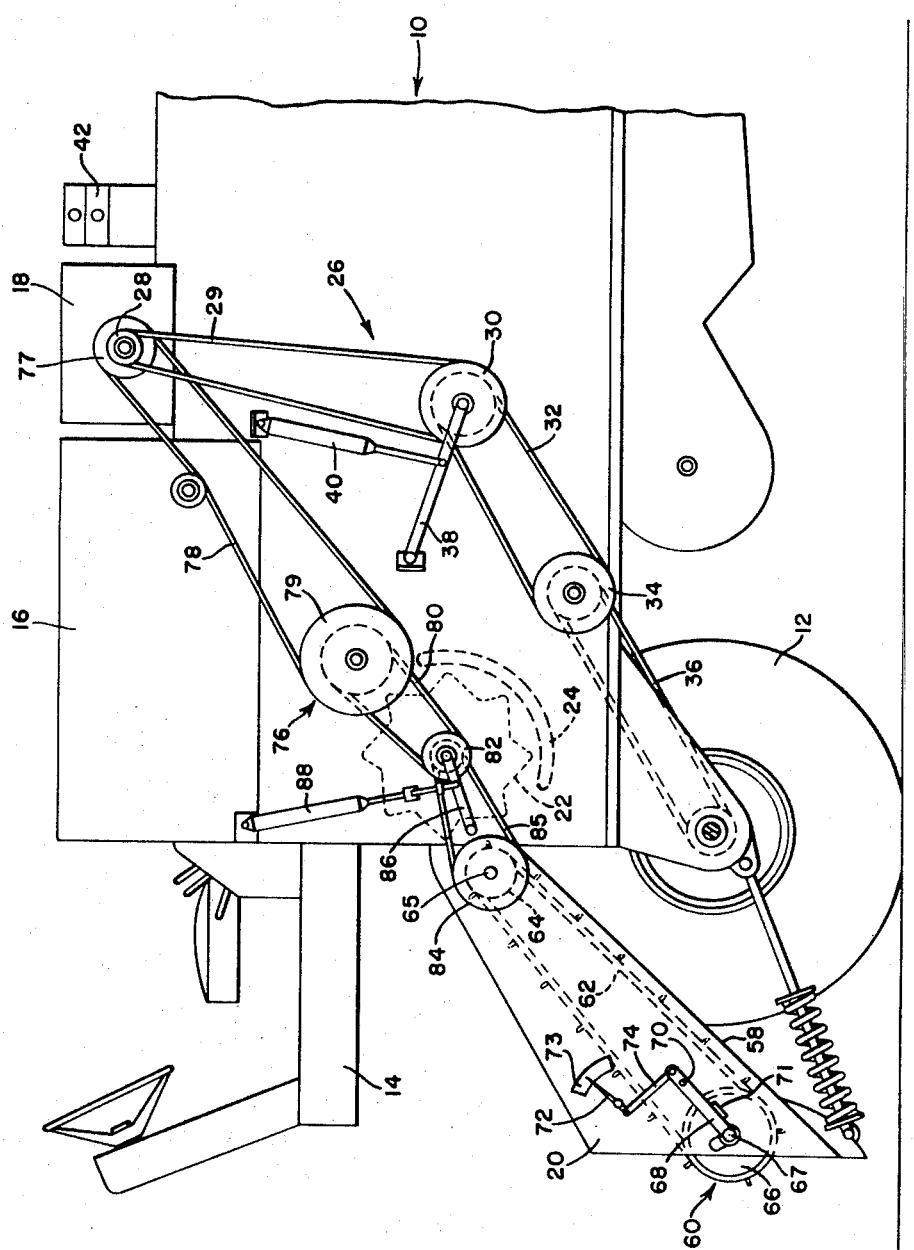
FIG. 1 is a side elevation view of the forward portion of a combine, with the harvesting header removed, and embodying the present invention.

The invention is embodied in a self-propelled combine having a main separator body, indicated in its entirely by the numeral 10, mounted on a pair of forward drive wheels 12, the left-hand drive wheel being removed in FIG. 1 for purposes of clarity. An elevated operator's station 14 is mounted on the main body 10 forwardly of an elevated grain tank 16, and a conventional internal-combustion engine 18 is mounted on the combine body rearwardly of the grain tank 16 and functions as a power source for both propelling the combine and operating the harvesting and separating mechanisms.

The combine typically carries a forward transversely elongated harvesting header or platform (not shown), which removes the crop from the field, converges it, and delivers it rearwardly to a conventional upwardly and rearwardly inclined feeder house 20, which extends forwardly from the main separator body 10 and delivers the crop rearwardly through a forward inlet opening in the main body to a conventional threshing cylinder 22 having an associated concave 24. The combine also includes other separating components (not shown) mounted in the main separator body 10 rearwardly of the threshing cylinder and concave for separating the crop after it leaves the threshing cylinder.

The combine is propelled by the engine 18 through an infinitely variable belt-type propulsion drive, indicated generally by the numeral 26. The drive 26 includes an engine-driven pulley or sheave 28, which drives a belt 29 drivingly trained around one sheave of an inversely variable diameter sheave pair, the inversely variable diameter sheaves 30 being schematically illustrated in the drawings and being of conventional construction. The other sheave of the sheave pair 30 drives a second belt 32, which, in turn, drives one sheave of a fixed double sheave 34, the other sheave of which functions as the drive sheave of a belt drive 36, which drives the drive wheels 12.

The ratio in the propulsion drive 26 is varied by varying the position of the inversely variable diameter sheaves 30 mounted on the free end of a lever or control element 38 swingably mounted on the combine body. The position of the lever or control element 38 is established by a two-way hydraulic cylinder 40 acting between the combined body and a central portion of the lever. The extension of the hydraulic cylinder 40 is controlled by a hydraulic circuit, which includes an engine-driven pump 42 having an associated reservoir and a solenoid actuated control valve 44, the control valve being connnected to the pump via a pressure line 46, to the reservoir through a line 48, and to the opposite ends of the cylinder 40 through alternate outlet lines 50 and 51, which the control valve alternately connects to the pressure line 46 or the reservoir line 48 to extend or retract the cylinder. The valve 44 is a solenoid actuated valve controlled by a manually actuated switch 52 at the operator's station, the opposite ends of the valve being connected to the switch via alternate leads 54 and 56, which can be selectively connected to an electric power source, conventionally the combine battery, by the switch 52 to shift the valve in alternate directions and thereby selectively extend or retract the cylinder 40.

The feeder house 20 has an upwardly and rearwardly inclined floor 58 along which a conventional overshot elevator-type conveyor 60 drags the crop material received from the header. The conveyor 60 includes an endless flexible crop-engaging element 62 formed by a pair of chains disposed at opposite sides of the feeder house and connected by transversely extending slats or bars. The conveyor element is trained around a pair of rear rollers or sprockets 64 mounted on a transverse shaft 65 journaled at the rear of the feeder house and a pair of front rollers or sprockets 66 mounted on a transverse shaft 67 having its opposite ends rotatably carried by a pair of swingable arms or elements 68 mounted on pivots 70 at opposite sides of the feeder house, only the left side of the feeder house conveyor and the swingable arms being shown in FIG. 1. Thus, the front portion of the conveyor 60 is free to float upwardly and away from the floor 58 to accommodate different thicknesses of the mat of crop material between the conveyor element 62 and the floor. A minimum clearance between the conveyor element and the floor is maintained by a stop means 71 which limits the downward movement of the arms 68.

A swingable indicator 72 having an associated indicia 73 is connected to the arms 68 by means of an appropriate linkage 74 so that the position of the indicator relative to the indicia varies as the conveyor moves toward and away from the floor. Although the indicator is illustrated on the side of the feeder house for purposes of clarity, it is to be understood that it is preferably mounted at the operator's station or at some location clearly visible from the operator's station so that the operator can ascertain the thickness of the mat of crop material during operation of the combine.

The conveyor is driven at variable speeds relative to the speed of the engine and the separating mechanism by a variable-speed conveyor drive, indicated generally by the numeral 76. The drive 76 includes an engine-driven sheave 77, which drives a belt 78 drivingly trained around one sheave of a double sheave set 79. The other sheave of the sheave set 79 drives a belt 80, which in turn drives one sheave of a conventional inversely variable diameter sheave pair 82, the other sheave of which is connected to a conventional variable diameter sheave 84 by a belt 85, the sheave 84 being mounted on the shaft 65 to drive the rear roller or sprocket 64 of the feeder house conveyor 60.

As in the drive 26, the ratio in the conveyor drive 76 is varied by shifting the inversely variable diameter sheave pair 82, which is mounted on a swingable control element or arm 86. The position of the control element 86 is established by a two-way hydraulic cylinder 88 controlled by a solenoid actuated valve 90 similar to the valve 44, the valve 90 being connected to the pressure source 42 by a line 91, to the reservoir line 48 by a line 92, and to the opposite ends of the hydraulic cylinder 88 by alternate outlet lines 93 and 94.

The solenoid actuated valve 90 is automatically controlled through an electric control system, which preferably uses the conventional combine battery as a power source and is responsive to the thickness of the mat of the crop material at the forward end of the feeder house as determined by the clearance between the forward end of the conveyor element 62 and the feeder house floor 58 to automatically adjust the extension of the cylinder 88 and thereby vary the ratio in the conveyor drive 76. The control system basically compirses a first switch set, indicated in its entirety by the numeral 96, and responsive to the position of a cam-type switch actuating element 97 and a second switch set, indicated generally at 98, and responsive to the position of a second cam-type switch actuating element 99. The element 99 is rigidly connected to the piston of the hydraulic cylinder 88 and shifts longitudinally therewith, while the element 97 is longitudinally shiftable in response to movement of the forward end of the conveyor 60 toward and away from the feeder house floor, the element 99 preferably being connected to the swingable arm or element 68, the swingable indicator 72, or the linkage 74, the exact type of connection being unimportant as long as the element 97 shifts to the left (in FIG. 2) as the distance between the conveyor and the feeder house floor increases.

The detailed components of the control system can perhaps be best identified in conjunction with a description of the operation of the system.

Figure 2:
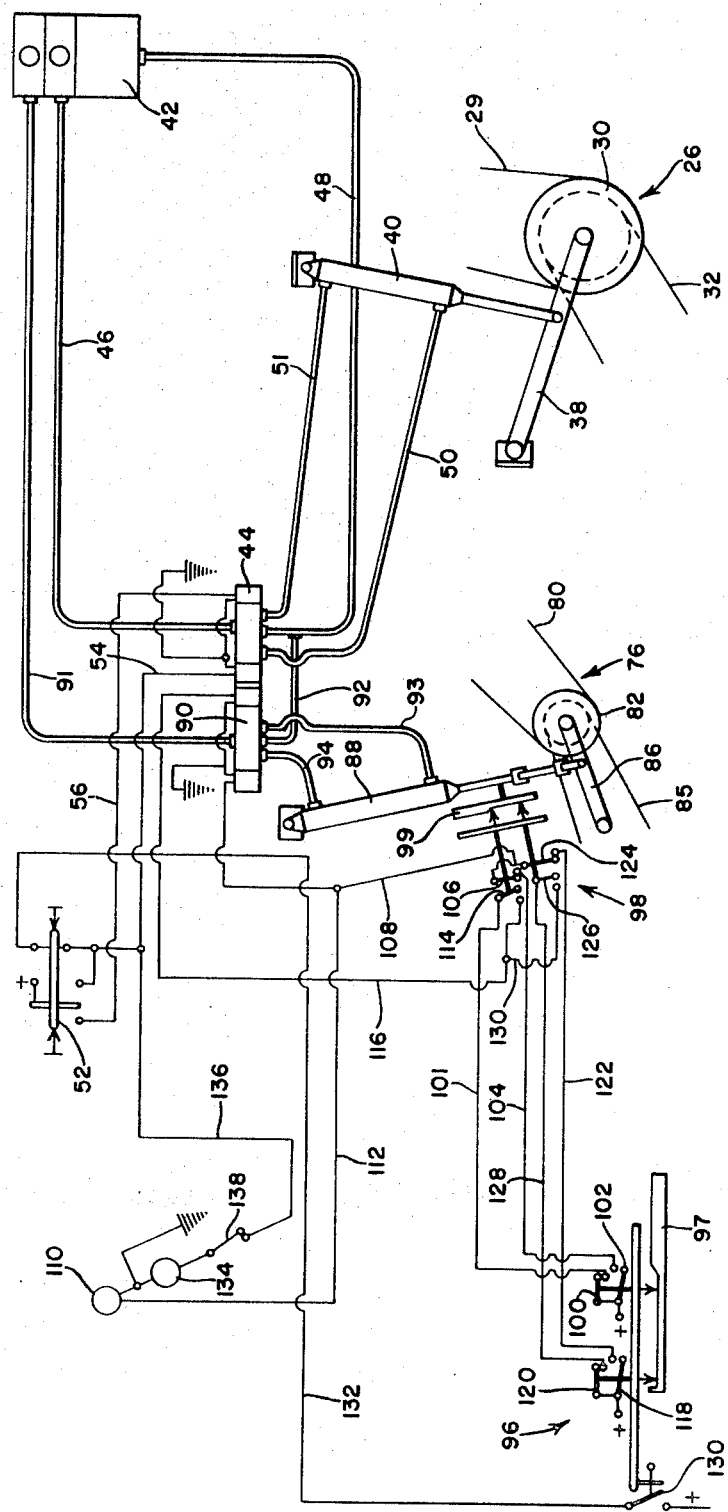
FIG. 2 is a schematic illustration of the control system for the combine shown in FIG. 1.

In FIGS. 1 and 2 the conveyor drive 76 is shown positioned for minimum speed of the conveyor, the cylinder 88 being retracted so that the input belt 80 is at its maximum diameter on the inversely variable diameter sheave set 82, while the output belt 85 is at its minimum diameter on the sheave set 82. Also, the thickness of the mat of crop material under the conveyor 60 is less than a predetermined value so that the switch actuating element 97 is shifted into its furthest position to the right. As the thickness of the mat of crop material increases, the element 97 moves to the left, opening a switch 100 to interrupt the supply of electric power to the lead 101, while closing a switch 102 to supply electric power from the battery to a lead 104, the switches 100 and 102 being jointly actuated and being arranged so that one switch is automatically opened as the other is closed. The lead 104 is connected to a switch 106 in the switch set 98, and since the switch 106 is initially closed, electric power is supplied to a lead 108 connected to the solenoid valve 90, whereby the valve 90 is actuated to supply fluid pressure to the upper end of the cylinder 88 to cause the cylinder to extend and swing the arm or control element 86 downwradly. This, of course, reduces the diameter of the belt 80 on the sheave set 82 while increasing the diameter of the belt 85 on the sheave set, so that the drive ratio in the conveyor drive 76 is increased, increasing the speed of the conveyor. When the lead 108 is connected to the power source, electric power is also supplied to an indicator light 110 via a lead 112, the indicator light 110 preferably being located at the operator's station and indicating to the operator that the feeder house conveyor is being driven at an increasing speed.

A second switch 114 is jointly actuated with the switch 106 and is automatically maintained in an open condition when the switch 106 is closed and in a closed condition when the switch 106 is open. As the cylinder 88 extends, the cam-type switch actuating element 99 moves downwardly, opening the switch 106 to interrupt the flow of electric current to the valve 90 via the lead 108, whereby the valve 90 is returned to its neutral condition, locking the cylinder 88 and the drive 76 in their adjusted positions. If the feed rate of the crop material is such that the increased speed of the feeder house conveyor will reduce the mat of crop material to a sufficient degree that the element 97 shifts back to its initial position, as shown in FIG. 2, the switch 100 will return to a closed position, and since the switch 114 is also closed, electric current will be supplied to a lead 116 via the switch 100, the lead 101, and the switch 114, and since the lead 116 is connected to the opposite end of the valve 90, the electric current therein actuates the valve 90 so that the lower end of the cylinder is pressurized via the hydraulic line 93 while the upper end is exhausted via the line 94, whereby the cylinder is retracted until the element 99 returns to the position shown in FIG. 2 and the switch 114 is opened to interrupt the electric current to the lead 116 and the valve 90. However, it is contemplated that the operator will adjust the forward speed of the combine via the manually actuated switch 52, which controls the valve 44 and consequently the extension of the cylinder 40 and the ratio in the propulsion drive 26 so that a sufficient crop feed rate is maintained to keep the switch 100 open and thereby maintain the cylinder 88 in a partially extended condition and maintaining the conveyor drive speed above the minimum speed.

If, in this condition, the thickness of the mat of crop material underneath the feeder house conveyor increases as a result of either increased crop density or an increase in the speed of the combine, the element 97 will shift further to the left, closing a switch 118 and opening a switch 120, which, like the switches 100 and 102, are jointly actuated into opposite conditions. The closing of the switch 118 supplies electric power to the line 108 via a lead 122 and a switch 124, which, like the switch 106, is actuated by the element 99 and has a jointly actuated switch 126 maintained in an opposite condition. The reconnection of the lead 108 to the electric power source again shifts the value 90 to cause a further extension of the cylinder 88 and consequent increase in speed for the feeder house conveyor drive. The additional extension of the cylinder 88 shifts the element 99 downwardly, so that after a certain additional extension of the cylinder, the element 99 opens the switch 124 and closes the switch 126, interrupting the current supply to the valve 90, whereupon the valve 90 returns to neutral and locks the cylinder in its new position.

Again, if the increased speed of the conveyor decreases the thickness of the mat of crop material, so that the element 97 shifts to the right a predetermined distance, the switch 118 will open while the switch 120 closes, supplying electric current through a lead 128, which, in turn, is connected to a lead 130 through the closed switch 126. The lead 130 is connected to the lead 116 so that the electric current now actuates the opposite end of the valve 90 to retract the cylinder 88 until the switch 126 opens or the thickness of the mat of the crop material again causes the switch 120 to open.

If the thickness of the mat of the material is sufficient that the switch 120 remains open and the cylinder 88 has attained its maximum extension as limited by the element 99 opening the switch 124, and if the thickness of the mat of crop material still increases, the element 97 will shift to its extreme position to the left, closing a switch 130, which supplies electric current to a lead 132 connected to the input lead 54 through the switch 52. The current in the lead 54 actuates the solenoid valve 44, which then ports pressurized fluid to the lower end of the cylinder 40 via the line 50, causing the cylinder 40 to retract. The retraction of the cylinder will swing the control element or arm 38 upwardly to increase the effective diameter of the belt 29 on one of the sheaves of the sheave set 30, while decreasing the effective diameter of the belt 32 on the sheave set 30, thereby reducing the ratio in the drive 26 and decreasing the ground speed of the combine to cause a reduction in the feed rate of the crop to the feeder house.

When electric current is supplied to the line 54, it actuates or lights a second indicator or warning lamp 134 via an electric lead 136, having a conventional blinker switch 138 so that the indicator lamp 134 flashes on and off. The flashing lamp 134 notifies the operator that the feed rate is such that the mat of the crop has exceeded the predetermined thickness, even though the conveyor is being driven at maximum speed.

Figure 3:
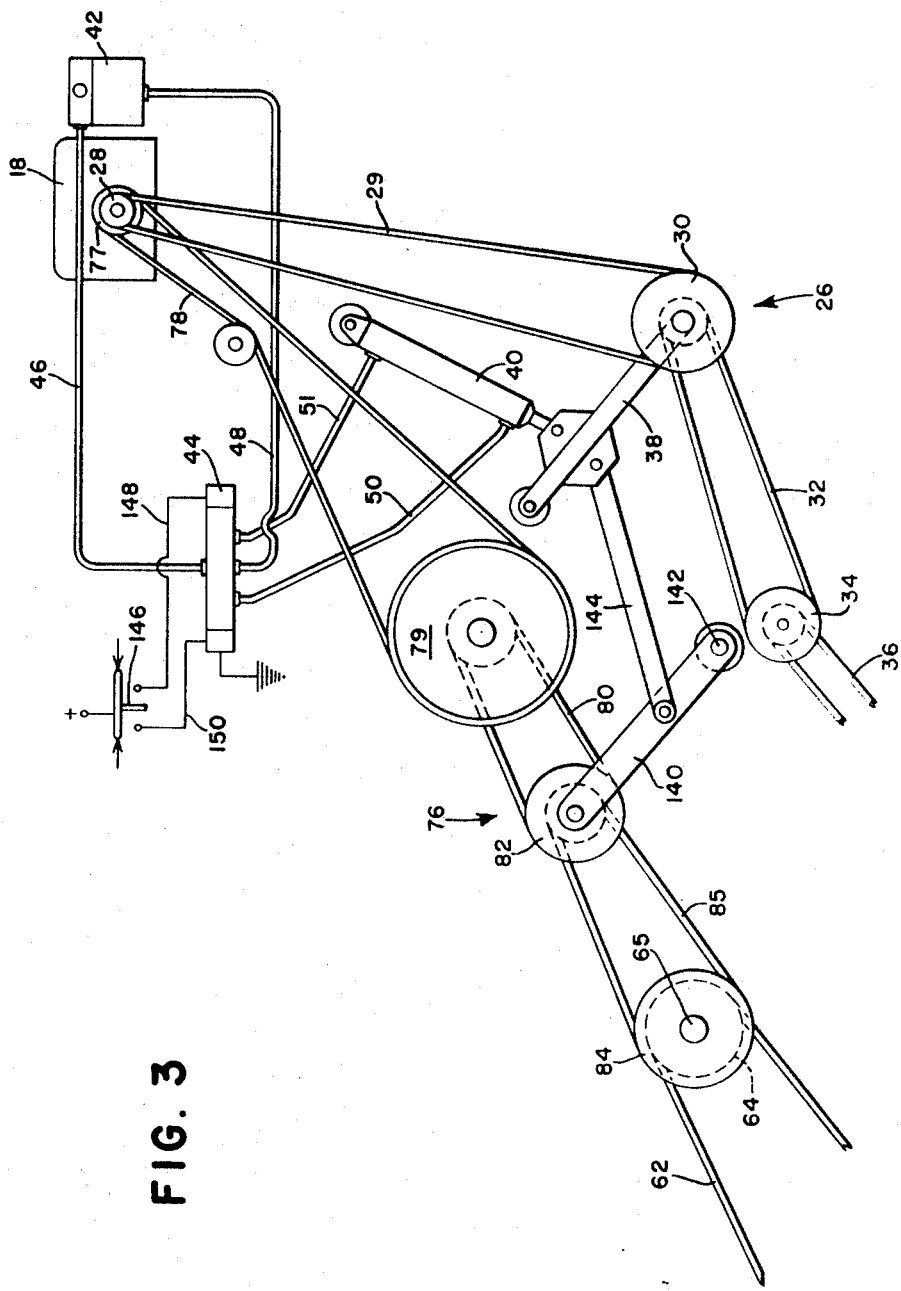
FIG. 3 is a schematic illustration similar to FIG. 2, but showing a different embodiment of the invention.

A slightly different embodiment of the invention is shown in FIG. 3, wherein the combine is provided with the same infinitely variable belt-type propulsion drive 26 and feeder house conveyor drive 76 as in the previous embodiment. The inversely variable diameter sheave set 82 in the feeder house conveyor drive 76 is again mounted on a swingable arm or control element 140, which is similar to the control element 86. However, the pivot 142 for the arm 140 is at a different location than in the previous embodiment, and the position of the arm 140 is not controlled by a separate hydraulic cylinder, but is rather controlled by the hydraulic cylinder 40, which also establishes the ratio in the propulsion drive 26, the control lever or element 38 for the drive 26 being connected to the control element 140 by means of a linkage 144, so that the ratio in the drive 76 is simultaneously adjusted as the ratio in the propulsion drive 26 is changed.

The control valve 44, which controls the extension of the cylinder 40, is again a solenoid-type valve controlled by an electric switch 146 similar to the previously-described switch 52. The switch 146 is preferably located at the operator's station and is manually actuated to supply electric current to alternate leads 148 and 150 respectively connected to the opposite ends of the valve 44, so that shifting of the switch 146 in opposite directions actuates the valve 44 in opposite directions to alternately extend or retract the cylinder 40.

As is apparent from the above, extension of the cylinder 40 increases the ratio in the propulsion drive 26 to increase the ground speed of the combine, and also increases the ratio in the conveyor drive 76, since extension of the cylinder causes the control element 140 to swing in a counterclockwise direction about the pivot 142, decreasing the diameter of the belt 80 on the sheave set 82 while increasing the diameter of the belt 85. This, of course, increases the speed of the conveyor drive. Thus, as the ground speed of the combine is increased, increasing the feed rate of the crop material to the feeder house, the speed of the feeder house conveyor is also increased, so that, even with the greater feed rate, the thickness of the mat of crop material between the conveyor and the feeder house floor will remain substantially the same. Thus, assuming that the density of the crop remains substantially constant, the thickness of the mat of material delivered to the threshing cylinder will remain constant regardless of the speed at which the combine is operated. The drives are adjusted so that the thickness of the mat of crop material in average crop conditions is maintained at the optimum thickness for maximum efficiency of the separating mechanism.

I claim:
1. In a combine having a mobile main frame, a crop separating mechanism in the main frame, a harvesting header carried by the main frame and adapted to remove the crop from the field, a power source, and a variable-speed propulsion drive means driven by the power source and shiftable into different conditions to propel the machine at different ground speeds, the improvement comprising: a conveyor means operative to move the crops from the header to the separating mechanism; a variable ratio conveyor drive means operative between the power source and the conveyor means to drive the conveyor means at different speeds relative to the power source; and control means operatively associated with the conveyor drive means for controlling the ratio therein.

2. The invention defined in claim 1 wherein the combine has a plurality of variable operating functions and each variable function has a shiftable element, the position of which is responsive to the condition of the variable function, and the control means is operatively connected to at least one of said shiftable elements to automatically vary the conveyor drive means ratio in response to the position of the shiftable element.

3. The invention defined in claim 2 wherein the propulsion drive means includes a control element shiftable to vary the propulsion drive means ratio and means operatively connecting the control means to said shiftable propulsion drive control element to automatically change the speed of the conveyor means in response to a change in the combine ground speed.

4. The invention defined in claim 3 wherein the propulsion drive means and the conveyor drive means each includes infinitely variable belt drives, including shiftable control elements and variable diameter pulleys mounted on said elements, the positions of the respective control elements establishing the ratio in the respective belt drives, and the propulsion drive means includes a hydraulic cylinder means adapted to establish the position of the propulsion drive control element, the connecting means between the control means and the shiftable propulsion drive element including a linkage means operatively connecting the shiftable control elements to automatically shift the conveyor drive control element in response to shifting of the propulsion drive control element.

5. The invention defined in claim 2 wherein the conveyor means includes a conveyor element shiftable into different positions in response to different quantities of crop material conveyed to the separating mechanism for a given speed of the conveying means, and the control means is operatively connected to the conveyor element to automatically change the speed of the conveyor means in response to certain changes in position of the conveyor element.

6. The invention defined in claim 5 wherein the conveyor means includes a feeder housing between the header and the main frame, including a rearwardly and upwardly inclined floor, a chain and slat type elevator conveyor element disposed above the floor and yieldable upwardly and away from the floor, the position of the conveyor element being responsive to the thickness of crop material moving upwardly and rearwardly between the floor and the lower portion of the conveyor element, the control means automatically changing the ratio in the conveyor drive means to change the speed that the lower portion of the conveyor element moves along the floor in response to predetermined changes in the thickness of the crop material between the conveyor element and the floor.

7. The invention defined in claim 5 wherein the variable ratio conveyor drive means includes an infinitely variable belt drive and a hydraulic cylinder means adapted to establish the ratio in said belt drive, and the control means includes a hydraulic control valve means adapted to control the extension of said cylinder means and means connecting the control valve means to the conveyor element for actuating the control valve means in response to predetermined changes in the position of the conveyor element.

8. The invention defined in claim 5 and including means operatively connecting the shiftable conveyor element to the propulsion drive means to adjust the propulsion drive means and change the ground speed of the combine in response to shifting of the conveyor element to a predetermined position.

9. The invention defined in claim 8 wherein the conveyor means is delivering crop material at a greater rate when said shiftable conveyor element reaches said predetermined position than in the position wherein it actuates the control means to adjust the ratio in the conveyor drive means.

References Cited

UNITED STATES PATENTS 3,073,099   1/1963   Anderson _____ 56—20

ANTONIO F. GUIDA, Primary Examiner